(12) United States Patent
Onishi et al.

(10) Patent No.: US 12,015,253 B2
(45) Date of Patent: Jun. 18, 2024

(54) CABLE TOWING MACHINE AND CABLE LAYING METHOD

(71) Applicant: Nippon Telegraph and Telephone Corporation, Tokyo (JP)

(72) Inventors: Jun Onishi, Musashino (JP); Yasuhiro Maehara, Musashino (JP); Hidenobu Hirota, Musashino (JP); Naotsugu Ambe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 350 days.

(21) Appl. No.: 17/605,147

(22) PCT Filed: May 10, 2019

(86) PCT No.: PCT/JP2019/018745
§ 371 (c)(1),
(2) Date: Oct. 20, 2021

(87) PCT Pub. No.: WO2020/230190
PCT Pub. Date: Nov. 19, 2020

(65) Prior Publication Data
US 2022/0231489 A1    Jul. 21, 2022

(51) Int. Cl.
*H02G 1/00*  (2006.01)
*B65H 51/04*  (2006.01)
*H02G 1/08*  (2006.01)

(52) U.S. Cl.
CPC ............. *H02G 1/085* (2013.01); *B65H 51/04* (2013.01); *B65H 2701/36* (2013.01)

(58) Field of Classification Search
CPC ........ B65H 51/04; B65H 51/10; B65H 57/04; B65H 2701/36; H02G 1/085; H02G 1/04
See application file for complete search history.

(56) References Cited

U.S. PATENT DOCUMENTS 4,508,251 A * 4/1985 Harada .................. B65H 51/14
                                                          226/25
4,729,272 A * 3/1988 Clement .................. B26D 1/08
                                                          83/436.15
(Continued)

FOREIGN PATENT DOCUMENTS

JP       S5380693 A     7/1978
JP       199413311 U    2/1994
WO  WO-2021078927 A1 *  4/2021  ............ B65H 51/10

OTHER PUBLICATIONS

[No Author Listed], "From human power to mechanical power-laying technology that balances safety and efficiency," NTT History Center of Technologies, retrieved on Apr. 17, 2019, retrieved from URL <http://www.hct.ecl.ntt.co.jp/panel/pdf/2_Ea_3_1-1.pdf>, 3 pages (with English translation).

*Primary Examiner* — Emmanuel M Marcelo
(74) *Attorney, Agent, or Firm* — Fish & Richardson P.C.

(57) ABSTRACT

It is intended to provide a cable pulling machine that can avoid, even when installed at a high place, a stop of pulling and a cable installation method. A cable pulling machine according to the present invention includes two roller portions c having outer peripheries between which a cable a is to be held and a guide f that introduces the cable a between the roller portions c. The guide f adjusts an angle θ formed between a straight line connecting respective centers o of the roller portions c and the cable a introduced between the roller portions c to a value of not less than 45° and not more than 90°.

5 Claims, 10 Drawing Sheets

(56) References Cited

U.S. PATENT DOCUMENTS

| | | | | |
|---|---|---|---|---|
| 5,263,624 A * | 11/1993 | Zuidberg | ................ | E21B 19/22 |
| | | | | 226/173 |
| 6,073,916 A * | 6/2000 | Plummer | ............... | B65H 51/10 |
| | | | | 254/134.3 R |
| 6,367,778 B1 * | 4/2002 | Mobley | ................ | B66D 1/7415 |
| | | | | 254/134.3 R |
| 7,475,865 B2 * | 1/2009 | Jeong | ....................... | H02G 1/08 |
| | | | | 254/215 |
| 2007/0034845 A1 * | 2/2007 | Plummer | ............... | H02G 1/085 |
| | | | | 254/134.3 FT |
| 2010/0200821 A1 * | 8/2010 | Tjader | ................ | F16L 55/1658 |
| | | | | 254/283 |
| 2015/0270034 A1 * | 9/2015 | Wabnegger | ............. | B21F 11/00 |
| | | | | 241/101.2 |
| 2020/0161810 A1 * | 5/2020 | Duncan | .................. | H01R 43/28 |
| 2021/0021091 A1 * | 1/2021 | Weber | .................... | B65H 59/34 |
| 2022/0289513 A1 * | 9/2022 | Fiorentini | ............ | B65H 49/205 |

* cited by examiner

CABLE TOWING MACHINE AND CABLE LAYING METHOD

CROSS-REFERENCE TO RELATED APPLICATIONS

This application is a National Stage application under 35 U.S.C. § 371 of International Application No. PCT/JP2019/018745, having an International Filing Date of May 10, 2019. The disclosure of the prior application is considered part of the disclosure of this application, and is incorporated in its entirety into this application.

TECHNICAL FIELD

The present disclosure relates to a cable pulling machine that pulls up a cable into midair and a cable installation method that suspends a cable in bridged relation in midair.

BACKGROUND ART

Figure 1:
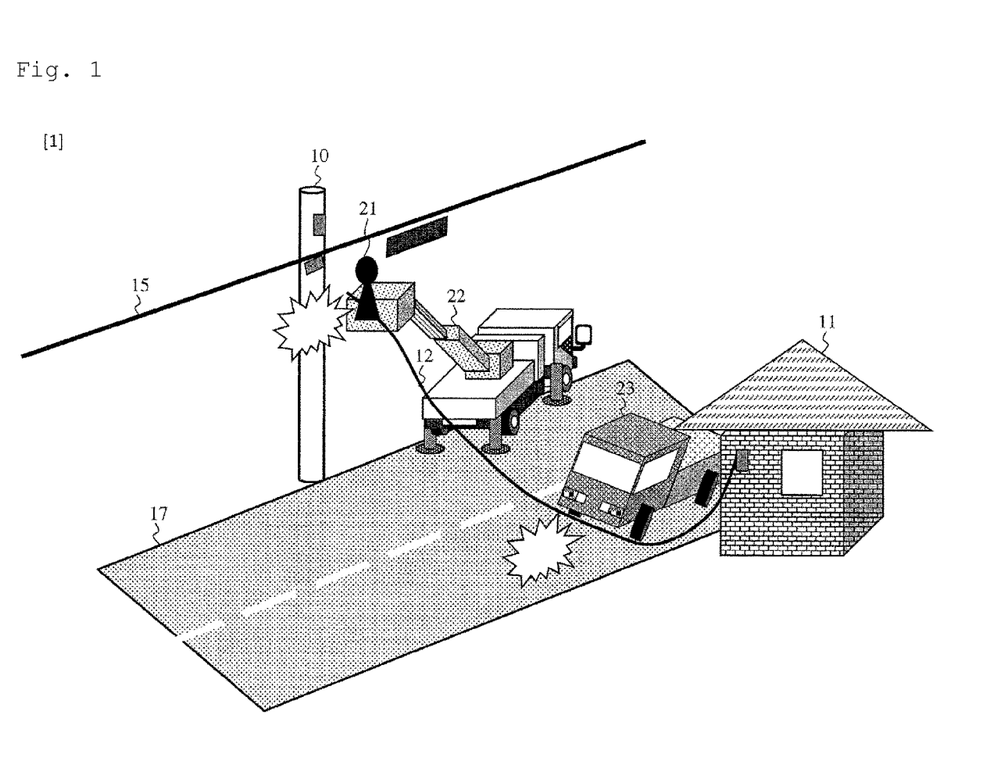
FIG. 1 is a diagram illustrating construction work of pulling a cable from a utility pole into a house.

FIG. 1 is a diagram illustrating construction work of pulling a cable 12 from a utility pole 10 into a house 11, which involves crossing a road. When such construction work is performed, a road 17 is closed to vehicular traffic, the cable 12 is allowed to drag on the road 17, a lift rope is connected to the cable 12, and a worker 21 is moved up to a high place by a high-place service vehicle 22 or the like, pulls up the cable 12 with human power, and fixes the cable 12 at the high place. At that time, when a vehicle 23 running on the road 17 does not stop and enters a working area, the vehicle 23 is caught in the cable 12 to result in an accident.

Figure 2:
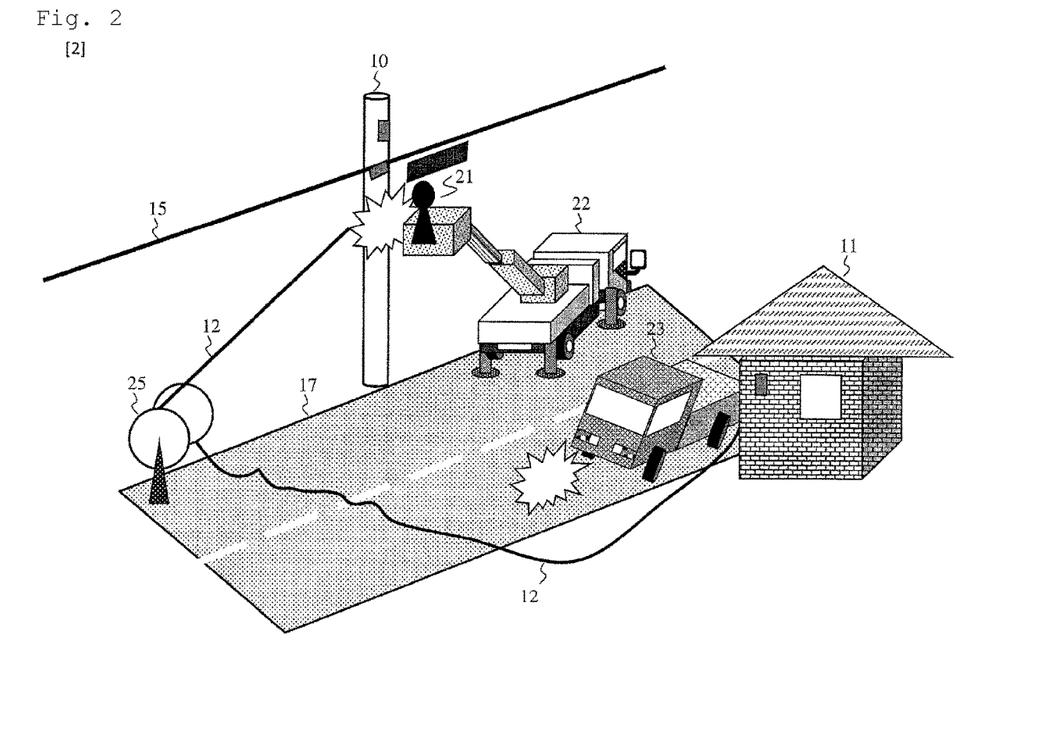
FIG. 2 is a diagram illustrating construction work of pulling the cable from the utility pole into the house by using a cable pulling machine.

FIG. 2 is a diagram illustrating construction work of pulling the cable 12 from the utility pole 10 into the house 11, which involves crossing a road and in which the worker 21 does not pull the cable 12. In the construction work in FIG. 2, a cable pulling machine 25 as described in NPL 1 is used. However, in the construction work as illustrated in FIG. 2 also, between the road 17 and the house 11, the cable 12 is merely moved crosswise along the ground. Consequently, an operation of pulling up the cable 12 to the high place is performed by the worker 21 with human power, and it is difficult to prevent the accident described above.

CITATION LIST

Non-Patent Literature

[NPL 1] http://www.hct.ecl.ntt.co.jp/panel/pdf/2_Ea_3_1-1.pdf (retrieved Apr. 17, 2019).

SUMMARY OF THE INVENTION

Technical Problem

Figure 3:
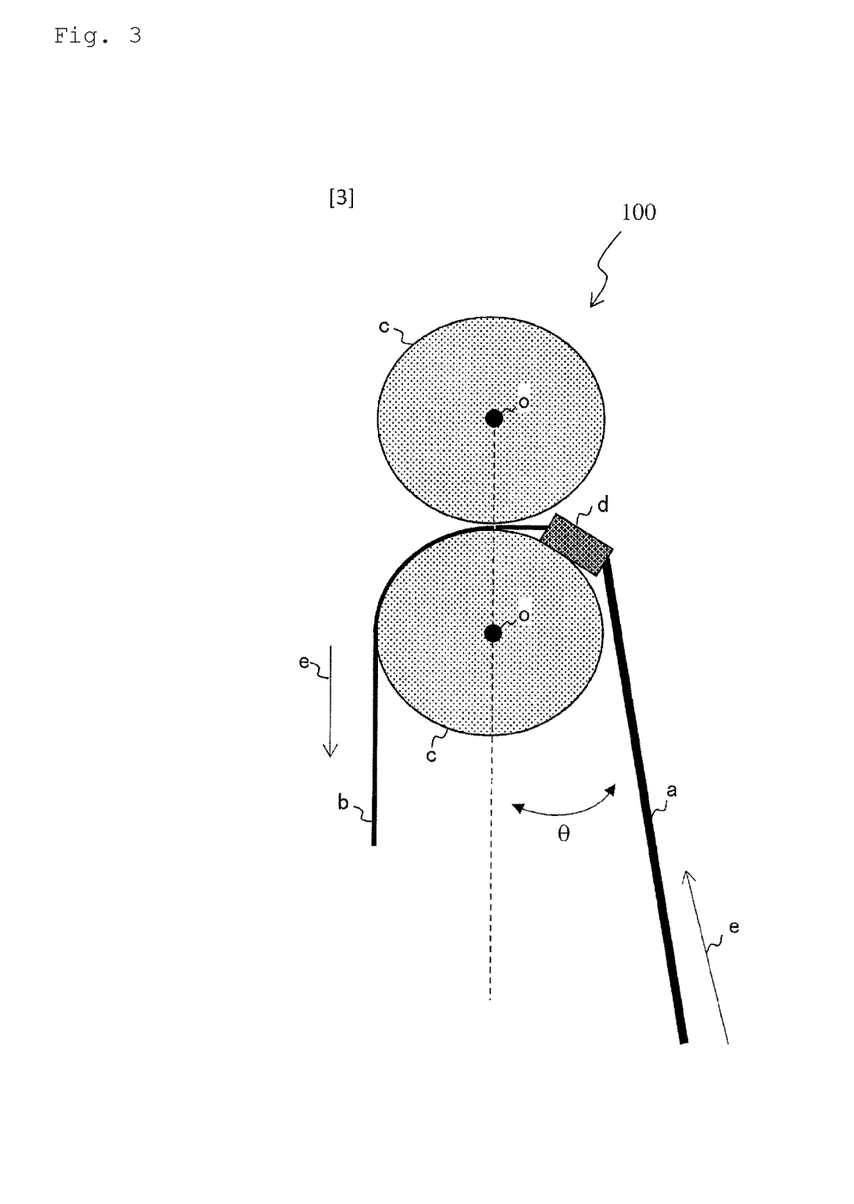
FIG. 3 is a diagram illustrating a cable pulling machine related to the present invention.

To avoid the accident, a pulling machine capable of pulling up a cable without interposition of a worker is required. FIG. 3 is a diagram illustrating such a pulling machine 100. By installing the pulling machine 100 at a high place and causing the pulling machine 100 to pull the cable, the cable can be pulled up without interposition of a worker. The pulling machine 100 has two roller portions (c). By holding a cable (a) or a traction rope (b) between the roller portions (c) and rotating the roller portions (c), the cable (a) or the traction rope (b) is pulled in a direction (e). However, when the pulling machine 100 is installed at a high place, a connection portion (d) between the hard cable (a) which is less plastically deformable and the traction rope (b) which is more plastically deformable may be caught in the roller portions (c) during pulling to stop the pulling. This is because, unlike in the cable pulling machine (above ground) in NPL 1, the connection portion (d) tends to pass at an acute angle between the roller portions (c). Note that the "acute angle" refers to a state in which an angle θ formed between a straight line connecting respective centers (o) of the roller portions (c) and the cable (a) is less than 45°.

Specifically, when a pulling machine as illustrated in FIG. 3 is installed at a high place, it is possible to prevent an accident as described above, but another problem of a stop of pulling arises. To solve the problem described above, an object of the present invention is to provide a cable pulling machine that can avoid, even when installed at a high place, a stop of pulling and a cable installation method.

Means for Solving the Problem

To attain the object described above, in the cable pulling machine according to the present embodiment, a guide is provided in a cable introduction portion to prevent a connection portion from being introduced at an acute angle between roller portions.

Specifically, the cable pulling machine according to the present invention is a cable pulling machine including: two roller portions having outer peripheries between which a cable is to be held; and a guide that introduces the cable between the roller portions, the guide adjusting an angle formed between a straight line connecting respective centers of the roller portions and the cable introduced between the roller portions to a value of not less than 45° and not more than 90°.

Even when the cable pulling machine is installed at a high place, the guide increases the angle at which the connection portion is introduced between the roller portions and reduces occurrence of a situation in which the connection portion is caught in the roller portions. Therefore, the present invention can provide the cable pulling machine that can avoid, even when installed at a high place, a stop of pulling.

In the cable pulling machine according to the present invention, the guide has a groove that guides the cable to a center of the outer periphery of each of the roller portions. When the cable is pulled, the cable does not meander, and a force from the roller portions is easily transmitted to the cable.

In the cable pulling machine according to the present invention, the guide has an uneven portion in the groove. When the cable is pulled, the cable does not meander, and the force from the roller portions is easily transmitted to the cable. The uneven portion can remove a deposit on the cable therefrom.

In the cable pulling machine according to the present invention, at least one of the roller portions has a plurality of recesses which are formed in a center of the outer periphery thereof and into which the cable is to fit. When the cable is pulled, the cable does not meander, and the force from the roller portions is easily transmitted to the cable.

The cable pulling machine according to the present invention further includes: a hook that allows the cable pulling machine to be hung on an existing aerial cable. This allows the present cable pulling machine to be easily installed at a high place.

A cable installation method according to the present invention is a cable installation method that uses the cable pulling machine described above to pull up the cable into midair, the cable installation method including: connecting_ a traction rope to a tip end of the cable; holding the traction rope between the two roller portions of the cable pulling machine and disposing the traction rope in the guide; hanging the hook on the aerial cable to install the cable pulling machine in midair; and rotating the roller portions of the cable pulling machine to pull the traction rope and pulling the cable pulled by the traction rope into the roller portions to pull up the cable to a level not lower than a predetermined height.

The present cable installation method, which uses the cable pulling machine described above, can avoid a stop of pulling even when the cable pulling machine is installed at a high place, allows the cable to be pulled up to the high place without the need for human power of a worker, and can prevent the accident described above. Therefore, the present invention can provide the cable installation method that can avoid, even when the cable pulling machine is installed at the high place, the stop of pulling.

Note that the invention described above can be combined as far as possible.

Effects of the Invention

The present invention can provide a cable pulling machine that can avoid, even when installed at a high place, a stop of pulling and a cable installation method.

DESCRIPTION OF EMBODIMENTS

Referring to the accompanying drawings, embodiments of the present invention will be described. The embodiments to be described hereinbelow are examples of the present invention, and the present invention is not limited to the following embodiments. It is assumed that components denoted by the same reference numerals in the present description and the drawings mutually denote the same components.

First Embodiment

Figure 4:
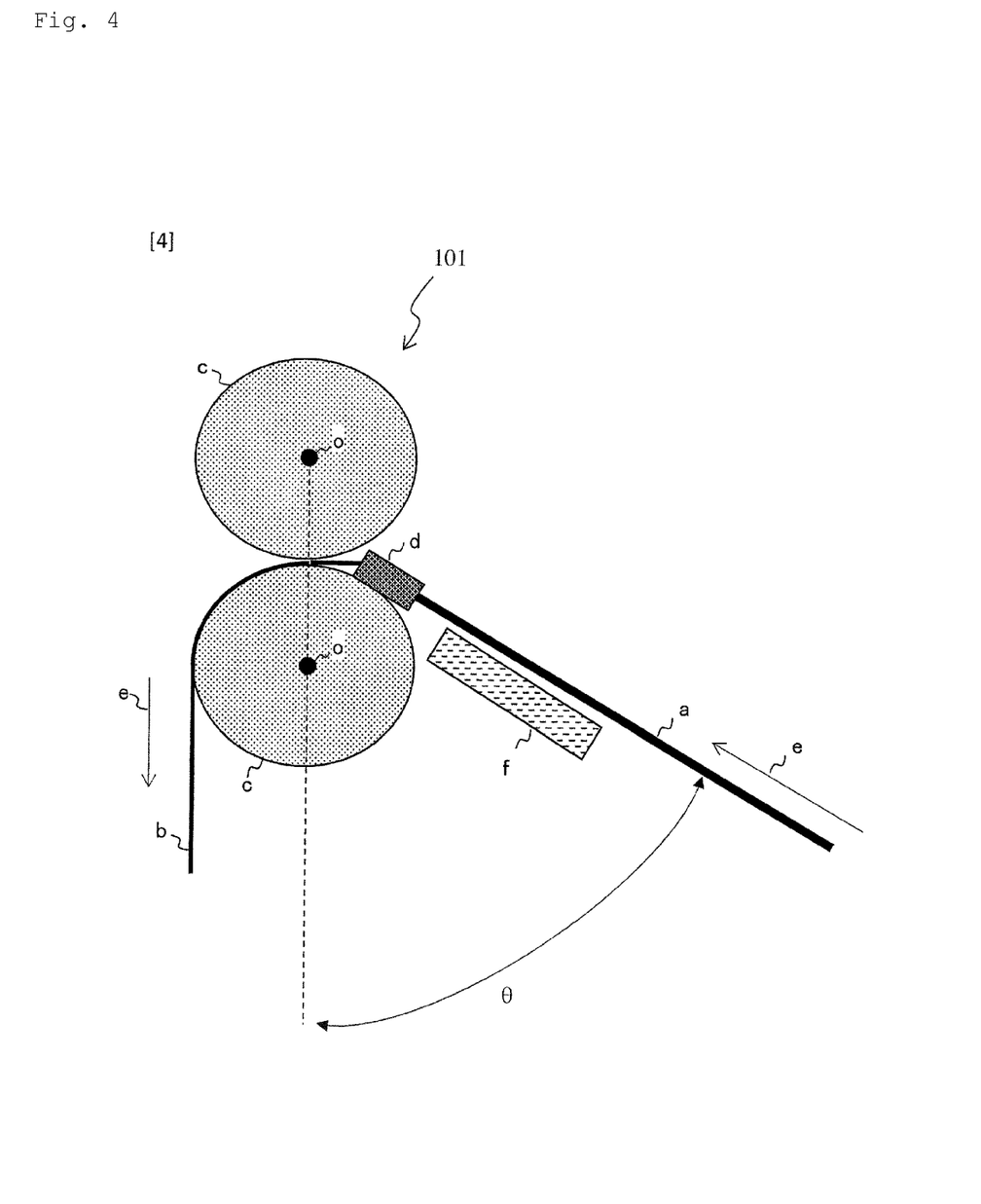
FIG. 4 is a diagram illustrating a cable pulling machine according to the present invention.

FIG. 4 is a diagram illustrating a cable pulling machine 101 in the present embodiment. The cable pulling machine 101 is a cable pulling machine including two roller portions c having outer peripheries between which a cable a is to be held and a guide f that introduces the cable a between the roller portions c. The guide f adjusts an angle θ formed between a straight line connecting respective centers o of the roller portions c and the cable a introduced between the roller portions c to a value of not less than 45° and not more than 90°.

Even when the cable machine 101 is installed at a high place, the presence of the guide f allows the angle θ to be larger than that in a cable pulling machine 100 in FIG. 3. As a result, a connection portion d is not introduced at an acute angle between the roller portions c. In other words, the cable a, a traction rope b, and the connection portion d, which are introduced from directions closer to a perpendicular to the straight line connecting the respective centers of the two roller portions c, are consequently introduced (pulled) under no load between the two roller portions c. Therefore, it is possible to prevent the connection portion d from being caught in the roller portions c.

Second Embodiment

When the pulling is performed using the roller portions c, it may be possible that the cable a, the traction rope b, or the connection portion d meanders from side to side and a force of the roller portions c cannot be sufficiently transmitted thereto. This results in a need for a functional portion that prevents the cable a, the traction rope b, and the connection portion d from meandering when the pulling is performed using the roller portions c. The embodiment will describe a first mode of the functional portion.

Figure 5:
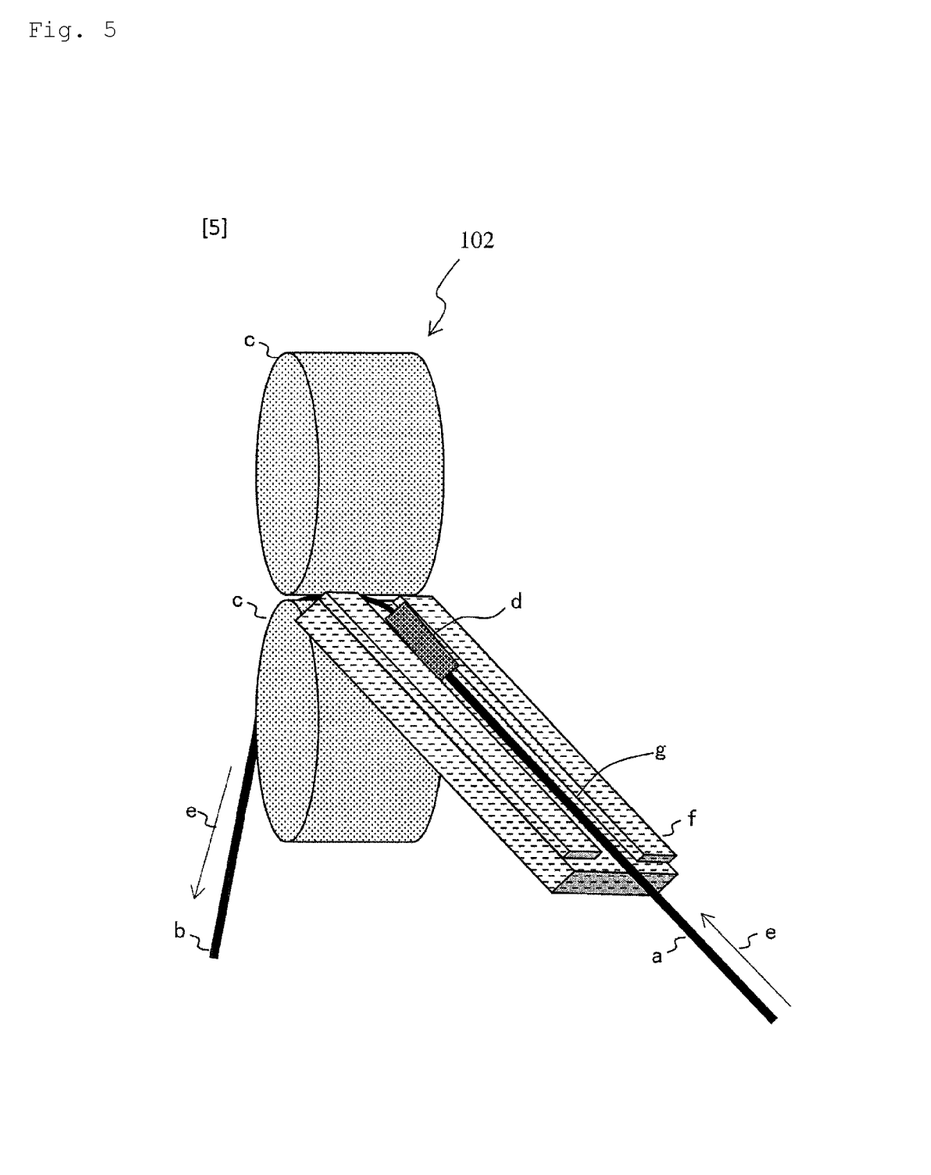
FIG. 5 is a diagram illustrating the cable pulling machine according to the present invention.

FIG. 5 is a diagram illustrating a cable pulling machine 102 in the present embodiment. The cable pulling machine 102 is characterized in that, in contrast to the cable pulling machine 101 in FIG. 4, the guide f has a guide groove g for guiding the cable a to a center of each of the outer peripheries of the roller portions c. A width of the guide groove g is adjusted to be slightly larger than a diameter or thickness of an object to be pulled (the cable a, the traction rope b, and the connection portion d) to allow the object to be pulled to fit in the guide groove g.

By thus providing the guide f with the guide groove g, when the object to be pulled is introduced between the roller portions c, the object to be pulled does not meander and is introduced between the roller portions c along the guide groove g. As a result, the object being pulled is guided to an appropriate position (place where a pulling force is easily transmitted thereto) between the roller portions c, which results in easier pulling. In other words, there is no need to enlarge a power source.

Figure 6:
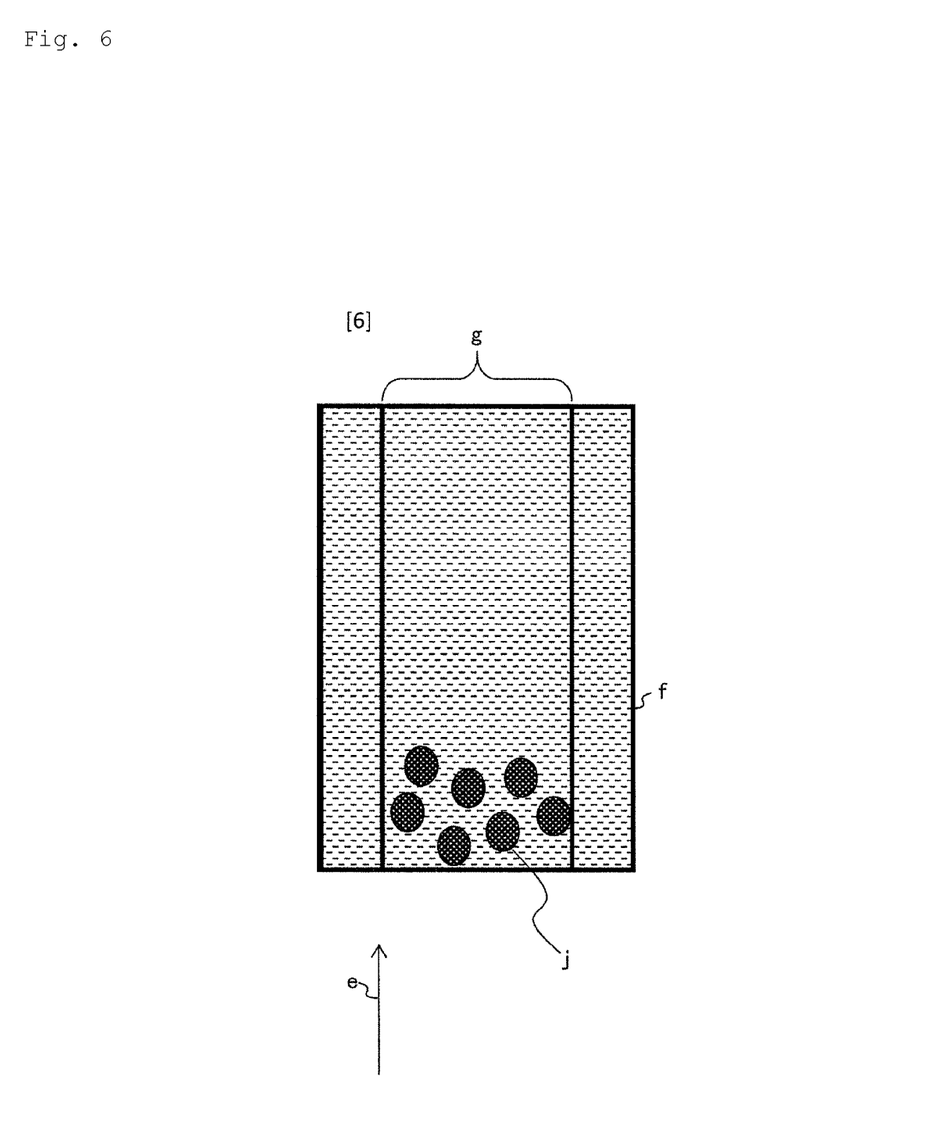
FIG. 6 is a diagram illustrating a guide of the cable pulling machine according to the present invention.

Also, as illustrated in FIG. 6, the guide f is characterized by having an uneven portion j in the guide groove g. By providing a portion of an entrance-side tip end of the guide groove (g) with minute unevenness (uneven portion j), it is possible to remove a deposit clinging to the cable a when the cable a is pulled.

Third Embodiment

Figure 7:
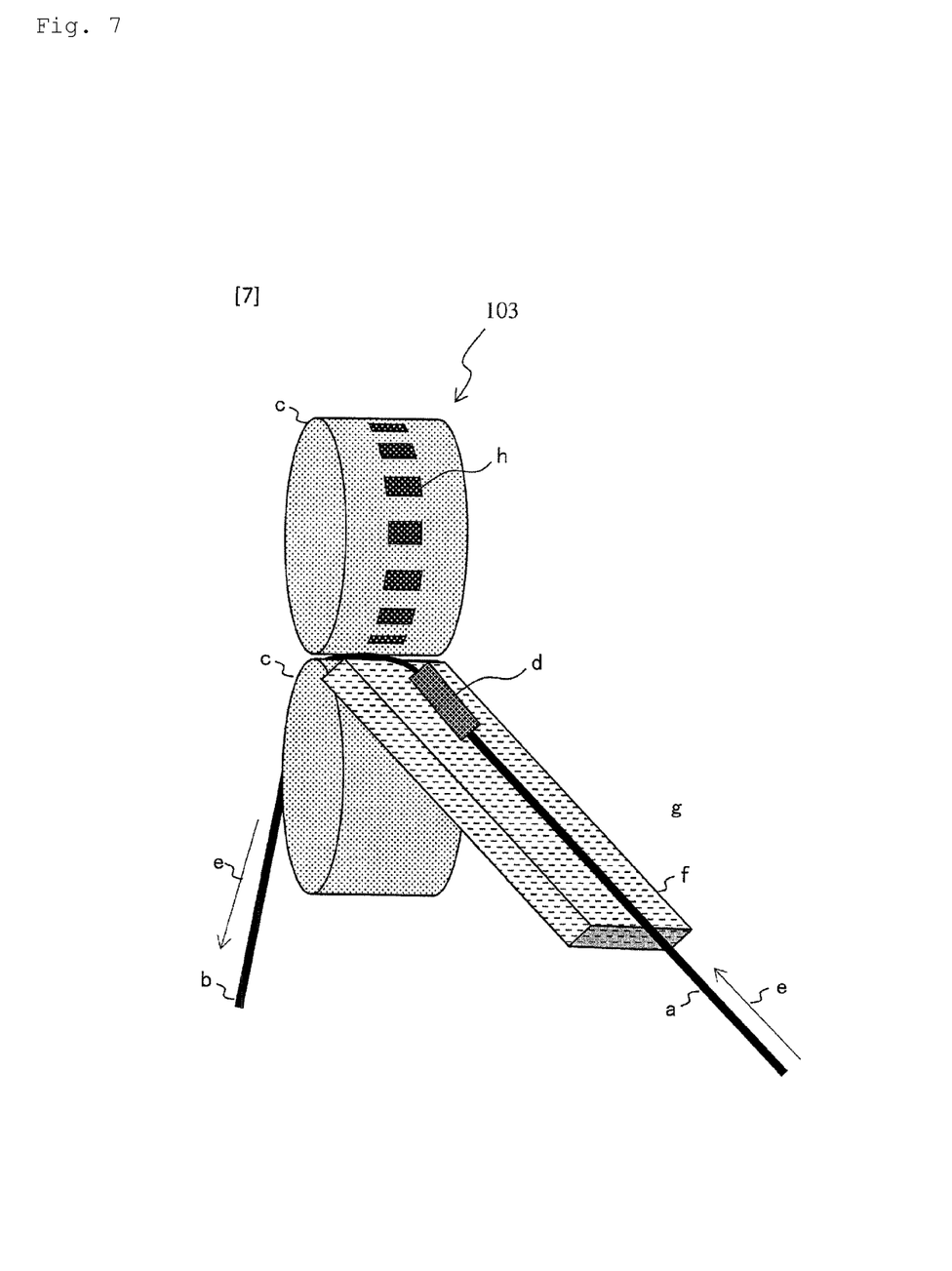
FIG. 7 is a diagram illustrating the cable pulling machine according to the present invention.

The present invention will describe a second mode of the functional portion. FIG. 7 is a diagram illustrating a cable pulling machine 103 in the present embodiment. The cable pulling machine 103 is characterized in that, by contrast to the cable pulling machine 101 in FIG. 4, at least one of the roller portions c has a plurality of recesses h which are formed in the center of the outer periphery and into which the cable a is to fit. A width of each of the recesses h is adjusted to be slightly larger than the diameter or thickness of the object to be pulled (the cable a, the traction rope b, or the connection portion d) to allow the object to be pulled to fit in the recess h.

Note that each of the recesses h is not a groove completely extending around the outer periphery of the roller portion c. The recesses h are aligned so as to round the outer periphery of the roller portion c. This is because, to pull the cable a, the roller portion c also requires a flat portion without the recesses h.

Since the roller portions c are thus provided with the recesses h, when introduced between the roller portions c, the object to be pulled fits into the recesses h to be introduced between the roller portions c without meandering. Consequently, the object to be pulled is guided to an appropriate position (place where the pulling force is easily transmitted) between the roller portions c, which results in easier pulling. In other words, there is no need to enlarge the power source. Note that, in FIG. 7, one of the roller portions c is provided with the recesses h, but both of the roller portions c may also have the recesses h.

Fourth Embodiment

Figure 8:
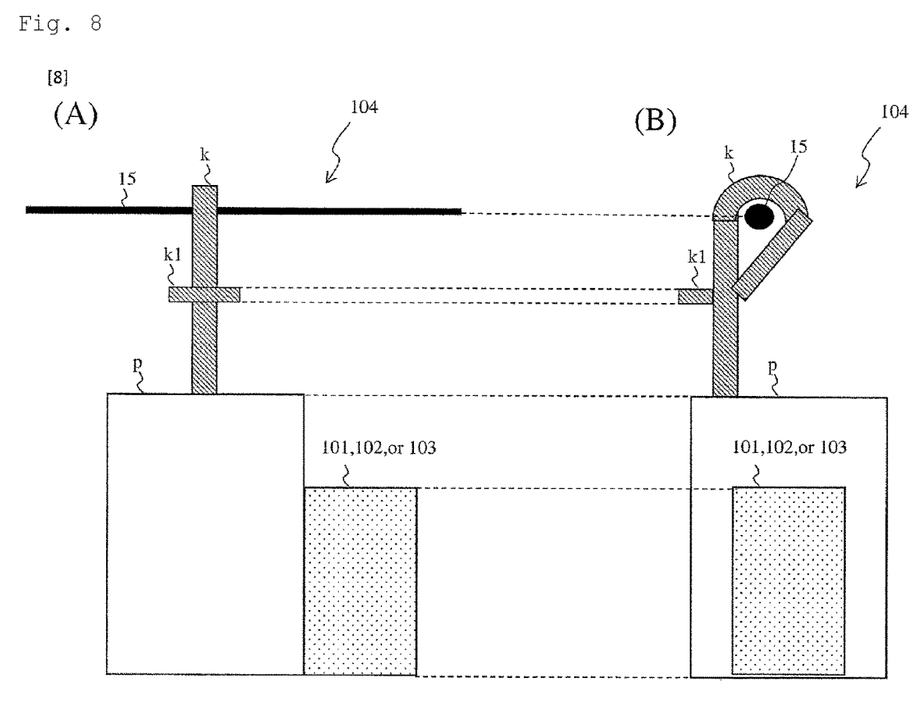
FIG. 8 is a diagram illustrating the cable pulling machine according to the present invention.

FIG. 8 is a diagram illustrating a cable pulling machine 104 in the present embodiment. FIG. 8(A) is a front view of the cable pulling machine 104. FIG. 8(B) is a side view of the cable pulling machine 104. In contrast to the cable pulling machines (101 to 103) in FIGS. 4, 5, and 7, the cable pulling machine 104 is characterized by further including a hook k to be hung on an existing aerial cable 15.

A casing p stores therein a power source, a control substrate, and other parts. The hook k includes a pulling machine installation hook k1 to be engaged with a tool (see FIG. 9) used to hang the pulling machine 104 on the existing aerial cable 15.

Figure 9:
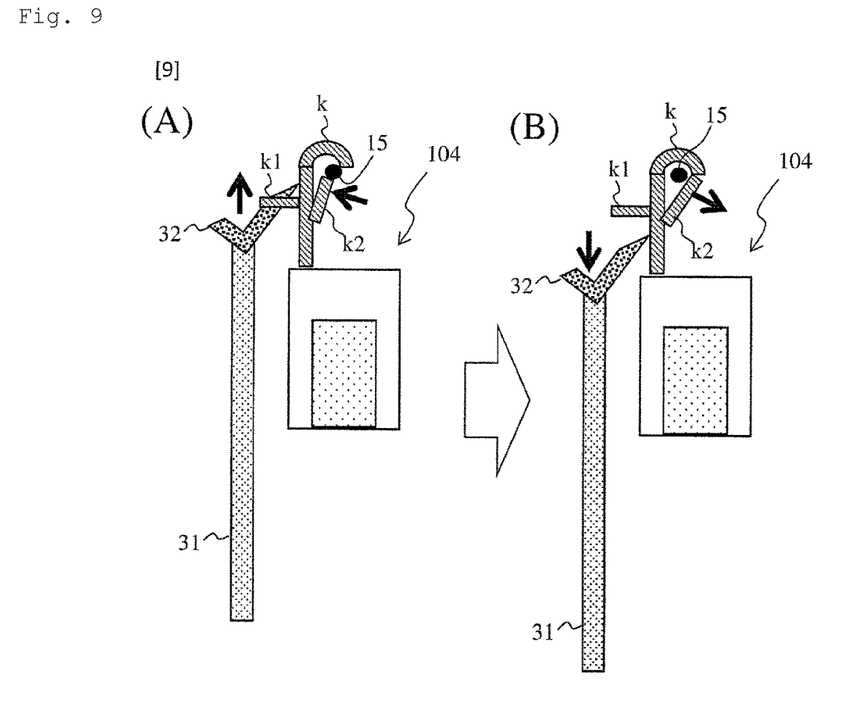
FIG. 9 is a diagram illustrating a method of operating the cable pulling machine according to the present invention.

FIG. 9 is a diagram each illustrating an operation of installing the cable pulling machine 104 on the aerial cable 15. FIG. 9(A) is a diagram when the hook k is about to be hung on the aerial cable 15. FIG. 9(B) is a diagram after the hook k is hung on the aerial cable 15. First, as illustrated in FIG. 9(A), when a hook 32 of a tool 31 is engaged with the pulling machine installation hook k1 and lifted upward, an open/close portion k2 of the hook k is opened. Through the opened open/close portion k2, the aerial cable 15 is inserted to hang the cable pulling machine 104 on the aerial cable 15. Subsequently, as illustrated in FIG. 9(B), the tool 31 is pulled down to allow the hook 32 to come off the pulling machine installation hook k1, and the open/close portion k2 of the hook k is closed. A worker uses the tool 31 to install the cable pulling machine 104 on the aerial cable 15, as illustrated in FIG. 9.

Fifth Embodiment

Figure 10:
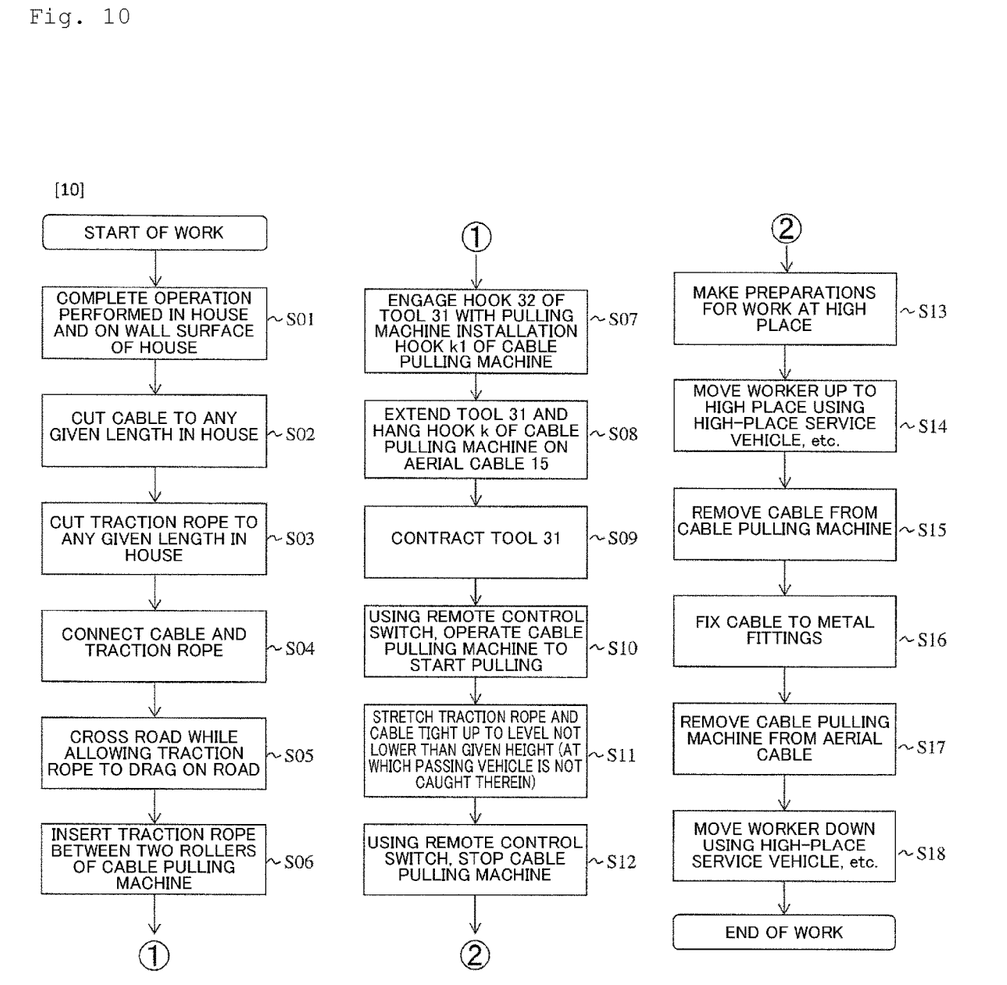
FIG. 10 is a flow chart illustrating construction work of pulling a cable from a utility pole into a house by using the cable pulling machine according to the present invention.
Figure 11:
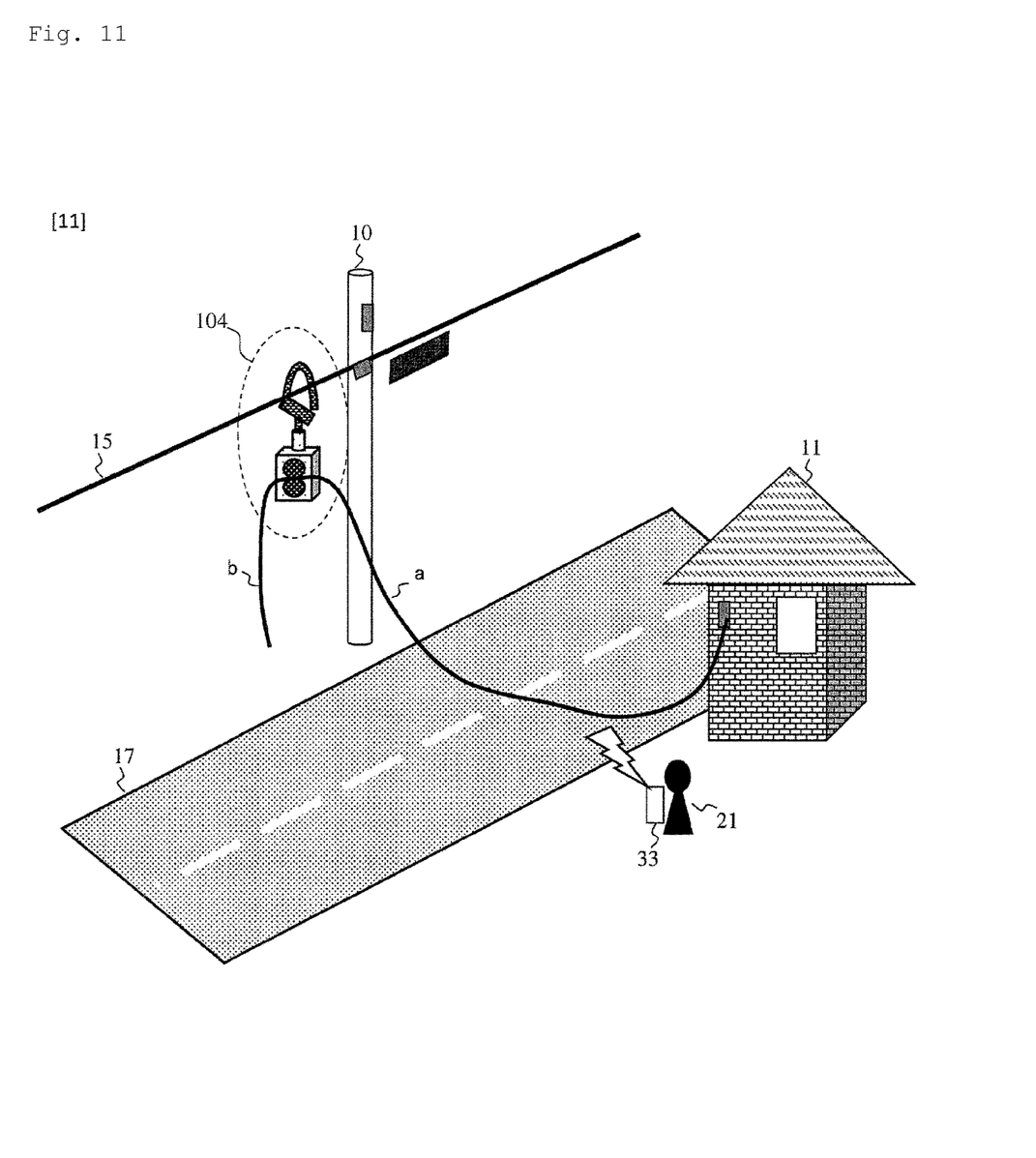
FIG. 11 is a diagram illustrating the construction work of pulling the cable from the utility pole into the house by using the cable pulling machine according to the present invention.

FIGS. 10 and 11 are diagrams illustrating a method of installing a cable by using the cable pulling machine 104. In the cable installation method in the present embodiment, the traction rope b is connected to a tip end of the cable a.

Then, the traction rope b is held between the two roller portions c of the cable pulling machine (101, 102, or 103) and disposed in the guide f.

Then, as illustrated in FIG. 9, the hook k is hung on the aerial cable 15 to install the cable pulling machine (101, 102, or 103) in midair.

Then, the roller portions c of the cable pulling machine are rotated to pull the traction rope b and further pull the cable a pulled by the traction rope b into the roller portions c.

The cable installation method in the present embodiment is characterized by thus pulling up the cable a to a level equal to or higher than a predetermined height.

Using FIGS. 10 and 11, a more detailed description will be given.

The worker 21 completes an operation performed in a house and on a wall surface of the house (Step S01).

The worker 21 cuts the cable a to any given length in the house (Step S02).

The worker 21 cuts the traction rope b to any given length in the house (Step S03).

The worker 21 connects the cable a and the traction rope b (Step S04).

The worker 21 crosses the road 17, while allowing the traction rope to drag on the road 17 (Step S05).

The worker 21 inserts the traction rope b between the two rollers c of the cable pulling machine 104 (Step S06).

The worker 21 engages the hook 32 of the tool 31 with the pulling installation hook k1 of the cable pulling machine 104 (Step S07).

The worker 21 extends the tool 31 and hangs the hook k of the cable pulling machine 104 on the aerial cable 15 (Step S08).

The worker 21 contracts the tool 31 (Step S09).

The worker 21 operates the cable pulling machine 104 by using a wireless remote control switch 33 to start a pulling operation (Step S10).

The traction rope b and the cable a are stretched tight up to a level not lower than a predetermined height (height at which a vehicle using the road 17 is not caught therein) (Step S11).

The worker 21 operates the cable pulling machine 104 by using the wireless remote control switch 33 to stop the pulling operation (Step S12).

The worker 21 makes preparations for working at a high place, such as preparing a high-place service vehicle (Step S13).

The worker 21 is moved up to a high place by the high-place service vehicle or the like (Step S14).

The worker 21 removes the cable a from the cable pulling machine 104 (Step S15).

The worker 21 fixes the cable a to metal fittings of the utility pole 10 or the like (Step S16).

The worker 21 removes the cable pulling machine 104 from the aerial cable 15 (Step S17).

The worker 21 is moved down by the high-place service vehicle or the like (Step S18).

The present cable installation method uses the cable pulling machine 104, and therefore can avoid a stop of pulling even when the cable pulling machine 104 is installed at a high place, pull up the cable a to a high place without the need for human power of the worker 21, and prevent the accident described above.

REFERENCE SIGNS LIST a Cable
b Traction rope
c Roller portion
d Connection portion
e Pulling direction
f Guide
g Guide groove h Recess
j Uneven portion
k Hook
k1 Pulling machine installation hook
k2 Open/close portion
10 Utility pole
11 House
12 Cable
15 Aerial cable
17 Road
21 Worker
22 High-place service vehicle
23 Vehicle
25 Cable pulling machine
31 Tool
32 Hook
33 Wireless remote control switch
100 to 104 Cable pulling machines

The invention claimed is:

1. A cable pulling machine comprising:
two roller portions having outer peripheries between which a cable is to be held;
a guide that introduces the cable between the roller portions, the guide being configured to adjust an angle formed between a straight line connecting respective centers of the roller portions and the cable introduced between the roller portions to a value of not less than 45° and not more than 90°; and
a hook that allows the cable pulling machine to be hung on an existing aerial cable.

2. The cable pulling machine according to claim 1, wherein the guide has a groove that guides the cable to a center of the outer periphery of each of the roller portions.

3. The cable pulling machine according to claim 2, wherein the guide has an uneven portion in the groove.

4. The cable pulling machine according to claim 1, wherein at least one of the roller portions has a plurality of recesses which are formed in a center of the outer periphery thereof and into which the cable is to fit.

5. A cable installation method that uses the cable pulling machine according to claim 1 to pull up the cable into midair, the cable installation method comprising:
connecting a traction rope to a tip end of the cable;
holding the traction rope between the two roller portions of the cable pulling machine and disposing the traction rope in the guide;
hanging the hook on the aerial cable to install the cable pulling machine in midair; and
rotating the roller portions of the cable pulling machine to pull the traction rope and pulling the cable pulled by the traction rope into the roller portions to pull up the cable to a level not lower than a predetermined height.

* * * * *